United States Patent Office 3,399,230
Patented Aug. 27, 1968

3,399,230
PREPARATION OF THIODISUCCINIC ACID VALUES
Robert W. Campbell, Orinda, Calif., assignor to Chevron Research Company, a corporation of Delaware
No Drawing. Filed June 1, 1965, Ser. No. 460,512
4 Claims. (Cl. 260—537)

ABSTRACT OF THE DISCLOSURE

Thiodisuccinic acid values are prepared by reacting a water solution of the mono-alkali metal salt of fumaric or maleic acid with hydrogen sulfide.

---

The present invention relates to a process for preparing thiodisuccinic acid values, i.e., thiodisuccinic acid itself and its half salt, for example, the disodium salt of thiodisuccinic acid.

Prior art methods exist for the preparation of thiodisuccinic acid. One such method involves the reaction of thiomalic acid and maleic acid (JACS, 76, 623 (1954)). Another method concerns the preparation of thiodisuccinic acid by the reaction of maleic anhydride and hydrogen sulfide in the presence of an organic solvent, such as benzene, to produce the dianhydride, which can be hydrolyzed to the acid (JOC 27, 3140 (1962)). Thiodisuccinic acid can also be prepared by the addition of hydrogen sulfide to dialkylmaleate followed by hydrolysis (U.S. Patent No. 2,603,616).

It has now been found that hydrogen sulfide adds to the alkali metal monosalt of maleic acid or fumaric acid (one carboxyl group neutralized with alkali metal base, such as sodium or potassium hydroxide) to yield the disalt of thiodisuccinic acid (two carboxyl groups neutralized with appropriate base). Substantially quantitative yields of thiodisuccinic acid are obtained by conventional hydrolysis, i.e., by acidifying the disalt and crystallizing it from water (solubility of thiodisuccinic acid is about 5 g. in 100 g. water at room temperature).

More particularly, it has been found that hydrogen sulfide adds very readily to the monosalt of maleic or fumaric acid in a water solution at a temperature in the range of 50 to 150° C., preferably about 70 to 90° C., and at a hydrogen sulfide pressure preferably greater than 30 p.s.i.g. pressure, i.e., about 50 to 1000 p.s.i.g., preferably around 100 to 500 p.s.i.g. The rate of reaction increases with increasing pressure and is apparently limited only by the equipment used. The reaction is generally complete in 1 to 10 hours, usually about 2 to 3 hours.

In a preferred embodiment of the invention, there are introduced into an enclosed reaction zone maleic acid or fumaric acid and an appropriate water solution of a base, for example, a solution of sodium hydroxide or potassium hydroxide having a concentration of about 5 to 50 weight percent based on the solution. In the event that maleic anhydride be used in place of maleic acid, the mixture of it with water or with the base is heated to effect hydrolysis to maleic acid. Generally, heating with stirring, to a temperature at which the addition of hydrogen sulfide occurs is sufficient.

The amount of base solution in the reaction mixture is calculated such as to be present in proportions of about one mol of the base, such as sodium or potassium hydroxide, for each mol of the acid or acid anhydride. The amount of base can be less than one mol per mol of acid or anhydride. Such lesser amounts, however, reduce the yield of desired product and require more severe reaction conditions, such as higher temperatures and pressures.

At a temperature in the range 25 to 90° C. hydrogen sulfide gas is introduced into the reaction zone in proportions sufficient to provide at least one mol for every two mols of acid or monosalt present in the reaction zone and to effect a pressure in the range 50 to 1000 p.s.i.g. At the completion of the reaction, as determined by no further drop in the hydrogen sulfide pressure, the pressure is released and excess hydrogen sulfide gas is removed.

The reaction product mixture containing the disalt of thiodisuccinic acid can then be further treated to produce free thiodisuccinic acid by acidification. The solution may be acidified with, for example, hydrochloric acid to a pH of 1. Upon cooling the free thiodisuccinic acid crystallizes, and may afterwards be recovered in a conventional manner and further purified if desired.

On the other hand, the reaction product mixture consisting essentially of a water solution of the disalt of thiodisuccinic acid can be treated with additional base, i.e., two mols of sodium or potassium hydroxide to produce tetrasodium or tetrapotassium thiodisuccinate (all carboxyl groups neutralized), which may be recovered by evaporation to dryness. This latter material is useful as a lime soap dispersant and as an anticaking agent for detergent compositions. Mixed salts may be obtained by neutralization with a base different than that used during reaction.

The following examples illustrate the practice of the invention.

Example 1

A 4.5-liter rocking autoclave was charged with 98 g. (1.0 mole) of maleic anhydride and 100 ml. of water. The mixture was heated with shaking to hydrolyze the anhydride to the acid. The autoclave was then cooled, and 40 g. (1.0 mole) of sodium hydroxide dissolved in 100 ml. of water was added. Hydrogen sulfide was pumped into the reactor until the pressure reached 100 p.s.i.g. The resulting mixture was heated and maintained at a temperature of 60–80° C. for two hours while it was being shaken. During this time, the pressure decreased from 115 p.s.i.g. to 78 p.s.i.g.

At the end of this time, the shaking was stopped and the hot gases were bled from the reactor through a caustic scrubber. The liquid water-white product was removed from the reactor while still warm. It was acidified with 37% HCl to a pH of 1–2. Upon cooling to room temperature, a white precipitate formed and it was removed by filtration. When dried, this precipitate weighed 124.3 g. (0.47 mole), a 94% (mole) yield based on maleic anhydride. This material had a melting point of 195° C. (J. Org. Chem. 27, 2145, gives M.P. 195–197° C.) and a neutralization equivalent of 66.4 (theory 66.5).

Example 2

A 4.5-liter rocking autoclave was charged with 98 g. (1.0 mole) of maleic anhydride, 100 ml. of water, and 80 g. (2.0 moles) of sodium hydroxide. It was heated to 73° C. while being shaken and then hydrogen sulfide was added to give a pressure of 50 p.s.i.g. at 73° C. The bomb was shaken while the temperature was gradually increased to 83° C. over a period of 1 hour and 10 minutes. When the pressure reached 42½ p.s.i.g. (at 76° C.) it was repressured to 50 p.s.i.g. with $H_2S$. This procedure was repeated when the pressure again reached 43½ p.s.i.g. (at 81° C.). The excess $H_2S$ was removed by a hot bleed. The product was filtered hot and then acidified with 37% HCl to a pH of 1. Upon cooling the acidified filtrate, a precipitate was formed which was recovered by filtration. After drying this product weighed 96.2 g. and had a melting point of 234° C. (dec.). The neutralization equivalent was 83.0. This example illustrates that under comparable conditions of reaction and make-up, the presence of 2 moles of caustic per mole of maleic acid yields an inferior product, as shown by the melting point and neutralization equivalent.

Example 3

A 4.5-liter rocking autoclave was charged with 42.2 g. (0.43 mole) of maleic anhydride, 200 ml. of water, and 5 g. (0.05 mole) of triethylamine. It was heated to hydrolyze the acid and then there was added 1250 g. (36.8 moles) of hydrogen sulfide. The autoclave was heated for 4 hours at 83–100° C. under a pressure of 1000–1275 p.s.i.g. It was then cooled and the contents were removed from the bomb. Upon evaporation to dryness, there was obtained 64.8 g. of an offwhite, waxy solid which had a melting point of 158° C. (dec.) and a neutralization equivalent of 84.3. This example illustrates that although an amine catalyzes the reaction of $H_2S$ with maleic anhydride in an anhydrous system, it is not a satisfactory catalyst for reactions in an aqueous system.

Example 4

A 4.5-liter rocking autoclave was charged with 98 g. (1.0 mole) of maleic anhydride, 150 ml. of water, and 1.0 g. (0.02 mole) of potassium hydroxide in 50 ml. of water. It was heated to hydrolyze the anhydride, and then there was added 340 g. (10 moles) of hydrogen sulfide. The resulting mixture was heated and agitated for 4 hours at 121–132° C. and 1000–1025 p.s.i.g. At the end of this time the reaction was cooled and the $H_2S$ was removed by bleeding. A white solid, 54.7 g. was removed from the reaction mixture by filtration. After drying, this material had a melting point of 199–203° C. (dec.). It weighed 54.7 g. (0.21 mole) which represents a 42% (mole) yield based on maleic acid.

This example illustrates that there is a falling off in yield of thiodisuccinic acid as the quantity of caustic is reduced from the preferred amount (i.e., 1 mole/mole of maleic acid). It also shows that relatively severe conditions of high temperature and high pressure are necessary in order to obtain thiodisuccinic acid at low catalyst concentrations.

Example 5

A 4.5-liter rocking autoclave was charged with 46 g. (0.47 mole) of maleic anhydride, 5 g. (0.09 mole) of potassium hydroxide, 400 ml. of water, and 340 g. (10.0 mole) of hydrogen sulfide. The mixture was heated at 127–132° C. for 2 hours. At the end of this time the gases were vented, and the reaction mixture was cooled to room temperature. A small amount of solid was removed by filtration. Analysis indicated that the solution contained about 50% (mole) of sodium thiodisuccinate.

This example further illustrates the difficulty of obtaining satisfactory yields at low catalyst concentrations.

Example 6

A 4.5-liter rocking autoclave was charged with 100 ml. of water and 300 g. (8.8 moles) of hydrogen sulfide. The reaction was then heated to 100° C., at which temperature the pressure was 700 p.s.i.g. Then a slurry at 58 g. (0.5 mole) of maleic acid in 200 ml. of water was pumped in at a rate of 2 ml. per minute. After all the acid was charged (about 2 hours) the reactor was maintained at 90–100° C. for an additional 1½ hours.

The pressure was released, and the liquid reaction mixture was filtered to remove a small amount (0.8 g.) of solid matter. Cooling of the filtrate did not cause precipitation, indicating little, if any, thiodisuccinic acid. Analysis by iodine titration indicated that this solution did contain about 26 g. of thiomaleic acid.

This experiment illustrates that a base catalyst is required in order to obtain thiodisuccinic acid.

As will occur to those skilled in the art in practicing the invention, the hydrogen sulfide and the monosodium salt of maleic acid can be formed in situ. This can be accomplished by adding about two moles of sodium bisulfide, or about one mole of disodium sulfide, to an aqueous solution of two moles of maleic acid. Additional quantities of hydrogen sulfide can be added to this reaction mixture to increase the pressure and, hence, the reaction rate.

I claim:

1. Process for preparing thiodisuccinic acid values which comprises heating a water solution of the mono-alkali metal salt of an acid selected from the group consisting of fumaric acid and maleic acid to a temperature in about the range 50 to 150° C. in the presence of hydrogen sulfide at a pressure greater than atmospheric pressure and in a ratio of at least one mol of hydrogen sulfide to two mols of the maleic acid monosalt.

2. Process for preparin gthiodisuccinic acid values which comprises heating maleic anhydride and an alkali metal hydroxide aqueous solution in proportions of approximately one mol of alkali metal hydroxide for each mol of maleic anhydride to form the mono-alkali metal salt of maleic acid, contacting the resulting solution with hydrogen sulfide at a pressure greater than atmospheric pressure and at a temperature in about the range 50 to 150° C. to form the disalt of thiodisuccinic acid, the hydrogen sulfide being present in an amount of at least one mol for each two mols of the salt.

3. Process according to claim 2, wherein the aqueous alkali metal hydroxide solution is selected from the group consisting of sodium and potassium hydroxide aqueous solutions.

4. Process according to claim 3 wherein the resulting solution is contacted with hydrogen sulfide under a pressure in about the range of 50 to 1000 p.s.i. and at a temperature in about the range of 70 to 90° C.

References Cited

UNITED STATES PATENTS

| | | | |
|---|---|---|---|
| 2,450,634 | 10/1948 | Dean et al. | 260—537 |
| 2,581,514 | 1/1952 | Chilcote | 260—537 |

OTHER REFERENCES

Zienty et al.: J. Org. Chem., vol. 27, 1962, pp. 3140–3146.

LORRAINE A. WEINBERGER, *Primary Examiner.*

V. GARNER, *Assistant Examiner.*